(12) United States Patent
Liu

(10) Patent No.: US 9,914,210 B1
(45) Date of Patent: Mar. 13, 2018

(54) TOOL CABINET

(71) Applicant: Chia-Ming Liu, Douliou (TW)

(72) Inventor: Chia-Ming Liu, Douliou (TW)

( * ) Notice: Subject to any disclaimer, the term of this patent is extended or adjusted under 35 U.S.C. 154(b) by 0 days.

(21) Appl. No.: 15/585,568

(22) Filed: May 3, 2017

(30) Foreign Application Priority Data

Jan. 23, 2017 (CN) ..................... 2017 2 0102800 U

(51) Int. Cl.
| | | |
|---|---|---|
| *A47B 81/00* | (2006.01) | |
| *B25H 3/06* | (2006.01) | |
| *G06F 3/16* | (2006.01) | |
| *H04R 1/02* | (2006.01) | |
| *B25H 3/04* | (2006.01) | |

(52) U.S. Cl.
CPC ................. *B25H 3/06* (2013.01); *B25H 3/04* (2013.01); *G06F 3/165* (2013.01); *H04R 1/028* (2013.01)

(58) Field of Classification Search
None
See application file for complete search history.

(56) References Cited

U.S. PATENT DOCUMENTS

| | | | | |
|---|---|---|---|---|
| 6,099,094 A * | 8/2000 | Lior | ....................... | A47B 21/00 108/50.01 |
| 6,560,114 B2 * | 5/2003 | Berry | ................... | H05K 7/1489 312/223.2 |
| 8,231,017 B2 * | 7/2012 | Clontz | ................... | A47B 96/02 211/134 |
| 8,696,075 B1 * | 4/2014 | Rios | ........................ | A47F 10/06 126/25 R |
| 9,566,704 B1 * | 2/2017 | Stoikos | ..................... | B25H 3/02 |
| 2007/0085454 A1 * | 4/2007 | Choi | ...................... | A47B 21/00 312/194 |
| 2009/0102337 A1 * | 4/2009 | Grela | ..................... | A47B 47/02 312/294 |
| 2010/0050909 A1 * | 3/2010 | Obiorah | ................. | A47B 81/06 108/50.11 |
| 2013/0264919 A1 * | 10/2013 | Sullivan | .............. | H05K 5/0204 312/223.2 |
| 2014/0085210 A1 * | 3/2014 | Avrahami | .............. | H04S 7/303 345/173 |
| 2014/0097731 A1 * | 4/2014 | Grela | ....................... | B25H 3/00 312/237 |
| 2014/0252927 A1 * | 9/2014 | Denny | .................. | B65D 83/02 312/209 |
| 2014/0375181 A1 * | 12/2014 | Bar-Erez | ................ | B25H 3/023 312/111 |
| 2015/0345182 A1 * | 12/2015 | Carlson | ................ | E05B 39/002 70/263 |
| 2017/0086332 A1 * | 3/2017 | Jaskela | ............. | H05K 7/20718 |
| 2017/0123450 A1 * | 5/2017 | Mittelman | ............ | G06F 1/1601 |
| 2017/0180838 A1 * | 6/2017 | Hemesath | ............. | H04R 1/026 |

* cited by examiner

*Primary Examiner* — Hanh V Tran
(74) *Attorney, Agent, or Firm* — Burris Law, PLLC

(57) ABSTRACT

A tool cabinet includes a cabinet unit and an audio device. The cabinet unit includes a cabinet body and at least one receiving member. The receiving member has a cover body and a bottom wall. The cover body is movably connected to the cabinet body. The bottom wall cooperates with the cover body to define a receiving space therebetween. The cover body is movable relative to the cabinet body to open and close the receiving space. One of the cabinet body and the cover body is formed with a coupling opening in communication with the receiving space. The audio device engages the coupling opening, is received in the receiving space, and has a sound output surface exposed from the coupling opening.

5 Claims, 6 Drawing Sheets

TOOL CABINET

CROSS-REFERENCE TO RELATED APPLICATION

This application claims priority of Chinese Patent Application No. 201720102800.3, filed on Jan. 23, 2017.

FIELD

The disclosure relates to a tool cabinet, and more particularly to a tool cabinet that is equipped with an audio device.

BACKGROUND

In recent years, people are in demand of music while working, and music is commonly played at a workplace (e.g., an office, a factory, a personal studio).

Generally, a conventional tool cabinet is designed for storage, compartmentalization, and protection of tools. When a user intends to listen to music during work, an external audio device (such as a loudspeaker) is required, thereby resulting in inconvenience and occupation of a certain space around the conventional tool cabinet.

SUMMARY

Therefore, an object of the disclosure is to provide a tool cabinet that can alleviate at least one of the drawbacks associated with the abovementioned prior art.

Accordingly, the tool cabinet includes a cabinet unit and an audio device. The cabinet unit includes a cabinet body, and at least one receiving member that has a cover body and a bottom wall. The cover body is movably connected to the cabinet body. The bottom wall cooperates with the cover body to define a receiving space therebetween. The cover body is movable relative to the cabinet body to open and close the receiving space. One of the cabinet body and the cover body is formed with a coupling opening that is in communication with the receiving space. The audio device engages the coupling opening, is received in the receiving space, and has a sound output surface that is exposed from the coupling opening.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
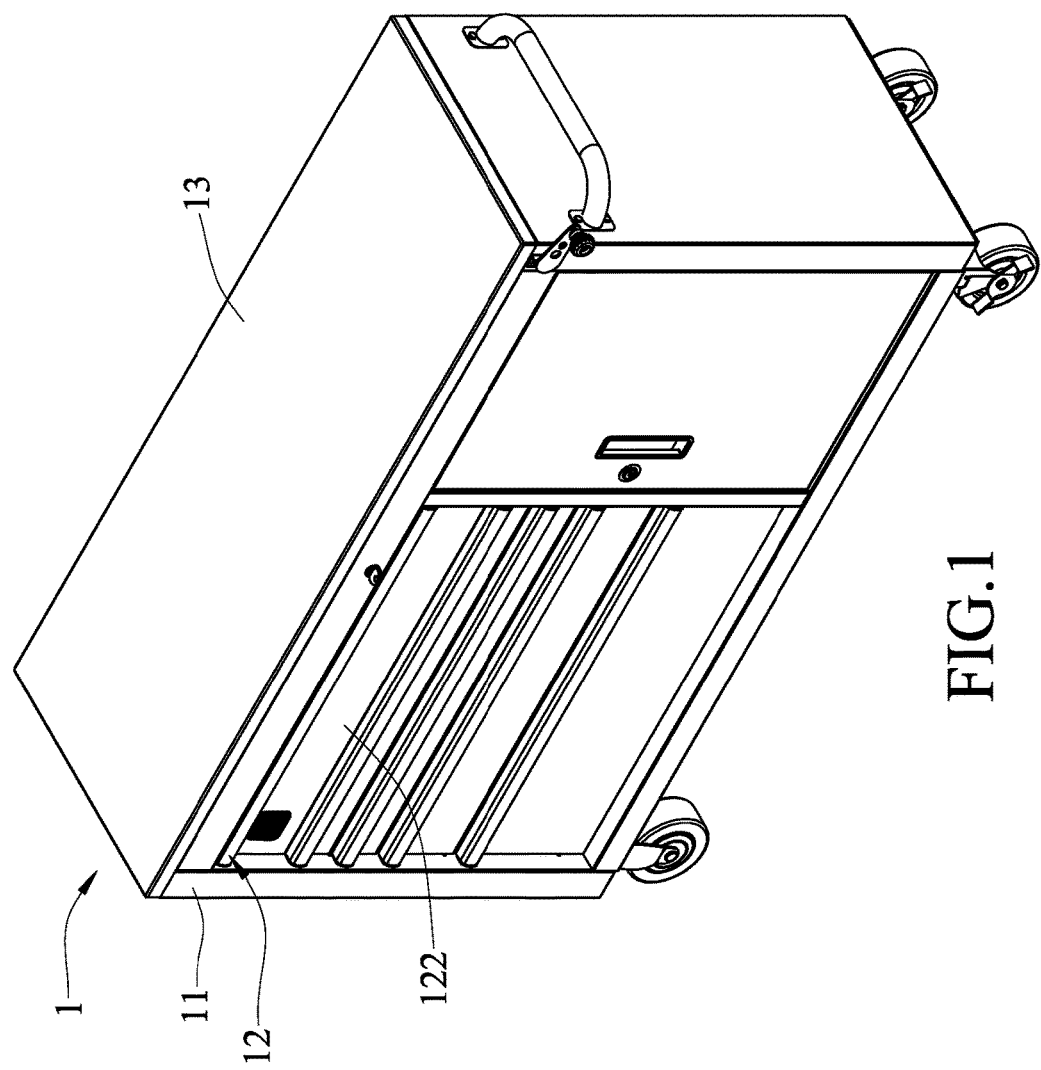
FIG. 1 is a perspective view of an embodiment of a tool cabinet according to the present disclosure.
Figure 2:
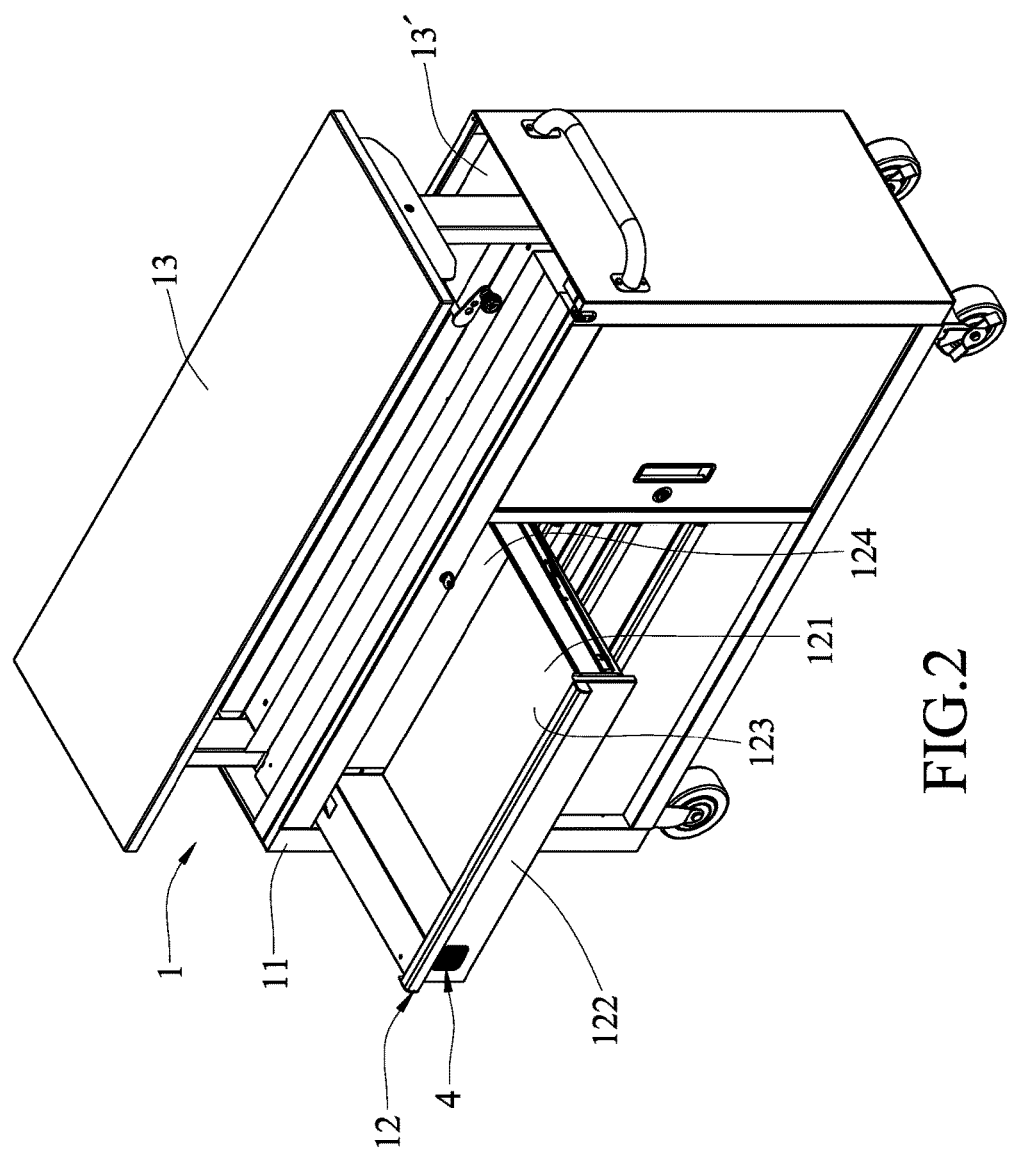
FIG. 2 is another perspective view of the embodiment, illustrating a receiving member of the tool cabinet being pulled out from a cabinet body of the tool cabinet.
Figure 4:
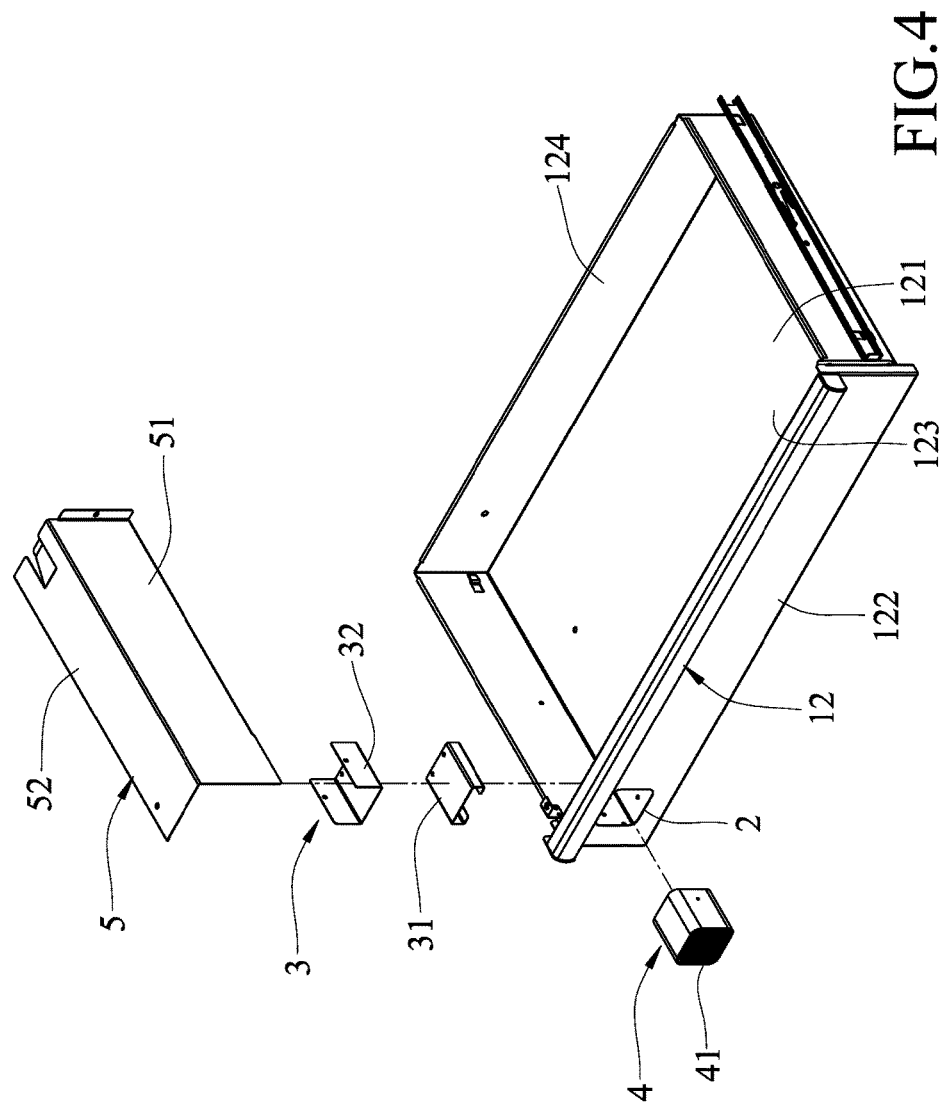
FIG. 4 is a fragmentary exploded perspective view of the embodiment.

Referring to FIGS. 1, 2 and 4, an embodiment of a tool cabinet according to the present disclosure includes a cabinet unit 1, a support seat 3, an audio device 4, and a covering member 5.

The cabinet unit 1 includes a cabinet body 11 and at least one receiving member 12. In this embodiment, the cabinet unit 1 includes one receiving member 12 which is configured as a drawer. The receiving member 12 has a cover body 122, a bottom wall 121, and a surrounding wall 124. The cover body 122 is movably connected to the cabinet body 11. The bottom wall 121 is connected to the cover body 122 and is co-movable with the cover body 122. The surrounding wall 124 is connected co-movably to the cover body 122 and the bottom wall 121. The bottom wall 121, the cover body 122, and the surrounding wall 124 cooperatively define a receiving space 123 with the surrounding wall 124 serving as a border of the receiving space 123. The cover body 122 is movable relative to the cabinet body 11 to open and close the receiving space 123.

Figure 3:
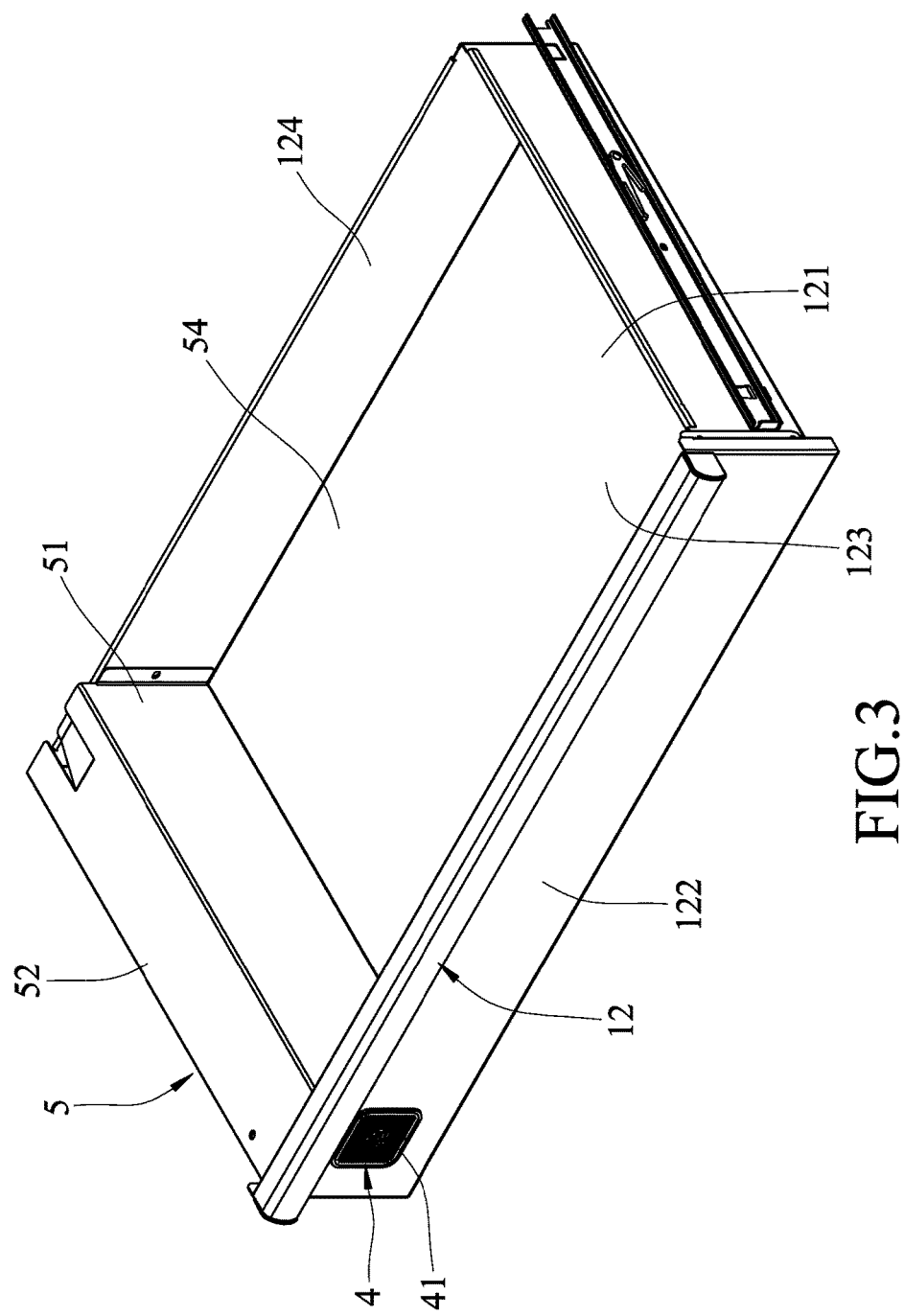
FIG. 3 is an enlarged perspective view of the receiving member, illustrating a covering member of the embodiment being disposed in a receiving space of the receiving member.
Figure 6:
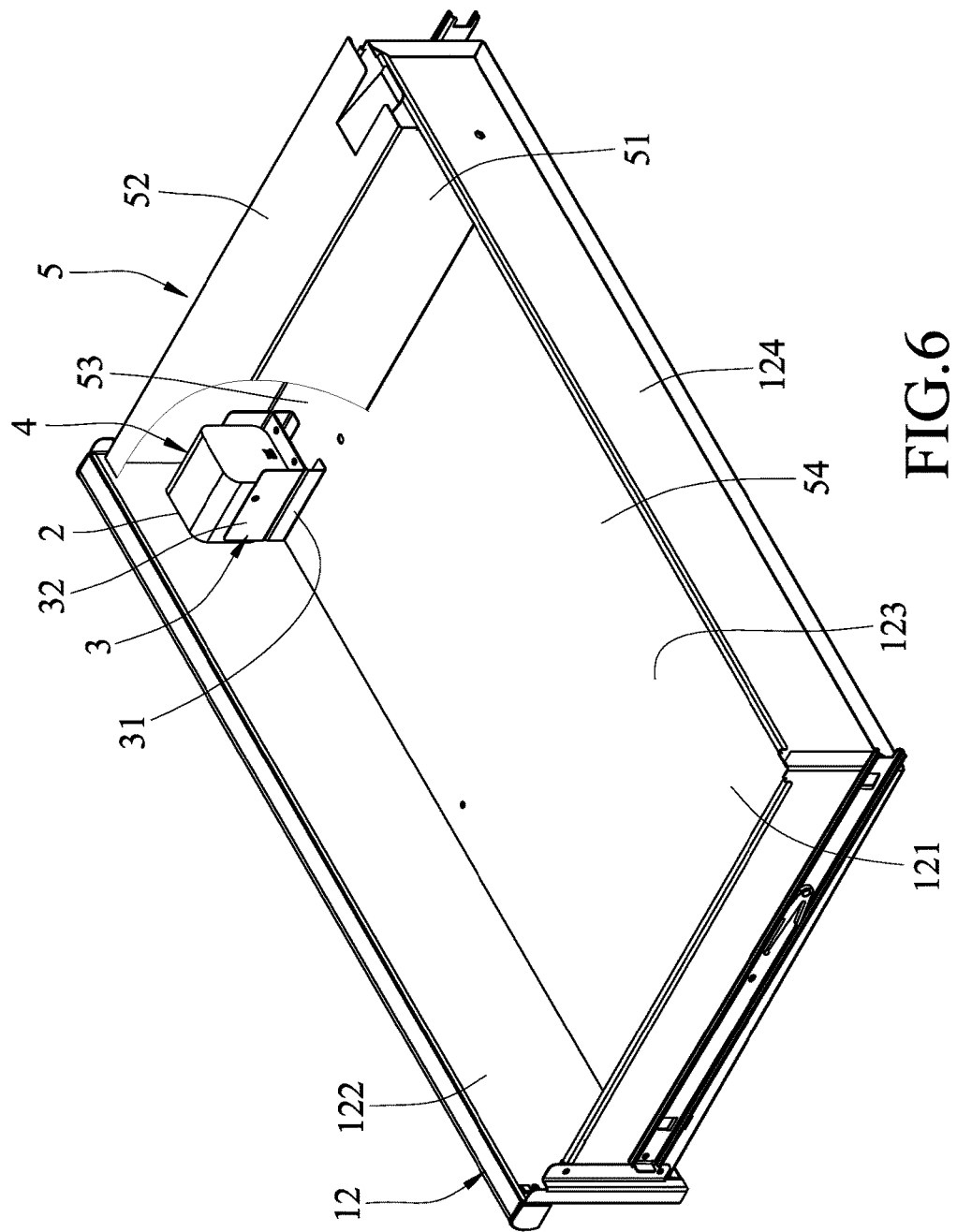
FIG. 6 is a fragmentary perspective view of the embodiment, illustrating the audio device being received in a first receiving portion of the receiving space.

Referring to FIGS. 3, 4 and 6, in this embodiment, the cover body 122 of the receiving member 12 is formed with a coupling opening 2 that is in communication with the receiving space 123.

The support seat 3 is received in the receiving space 123 and corresponds in position to the coupling opening 2. The support seat 3 includes a lower support member 31 mounted to the bottom wall 121 of the receiving member 12, and an upper support member 32 connected to the lower support member 31 and supporting the audio device 4 thereon.

Specifically, the audio device 4 is threadedly secured to the upper support member 32, and the lower support member 31 is disposed for elevating the audio device 4 and the upper support member 32, such that the audio device 4 can properly engage the coupling opening 2. The audio device 4 has a sound output surface 41 exposed from the coupling opening 2.

Figure 5:
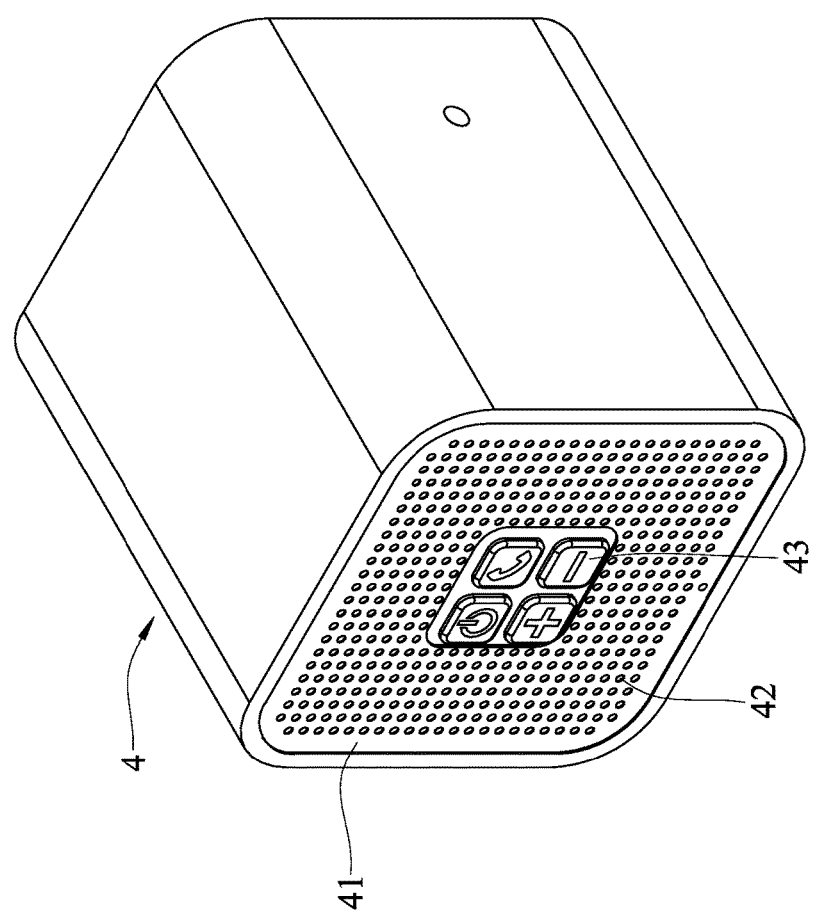
FIG. 5 is an enlarged perspective view of an audio device of the embodiment.

Referring to FIG. 5, the audio device 4 further has a sound-emitting module 42, and a control module 43 operable for generating a signal. In this embodiment, the sound-emitting module 42 is a speaker. The control module 43 of the audio device 4 is operable to turn on and off the audio device 4 and to control a volume of the signal (e.g., an audio signal), and can be connected to a mobile communication network. The control module 43 may have other functions in other embodiments to meet a user's requirement.

Referring back to FIGS. 3, 4 and 6, the covering member 5 is disposed in the receiving space 123, and has an upright side plate 51 connected to the bottom wall 121 of the receiving member 12, and an upper plate 52 extending from an end of the side plate 51 that is distal from the bottom wall 21 in a direction toward the surrounding wall 124. The covering member 5 divides the receiving space 123 into a first receiving portion 53 and a second receiving portion 54. The side and upper plates 51, 52 serve respectively as lateral and top borders of the first receiving portion 53 of the receiving space 123. The coupling opening 2 is in communication with the first receiving portion 53, and the audio device 4 is received in the first receiving portion 53 and covered by the covering member 5. The covering member 5 protects the audio device 4 from colliding with or being interfered by objects in the receiving space 123 during movement of the receiving member 12.

In use, after connecting the audio device 4 to the mobile communication network (e.g., bluetooth) of a mobile device (e.g., smartphone), the user can remotely play the music that is stored in the mobile device by operating the control module 43. In addition, in comparison with the aforesaid conventional tool cabinet, more space of the workplace is available to the user due to the disposition of the audio device 4. Therefore, the disadvantage associated with the aforesaid conventional tool cabinet can be avoided.

It should be noted that, while the receiving member 12 is exemplified as the drawer of the tool cabinet in this embodiment, the receiving member 12 may be configured, in other embodiments, as a structure at the top of the tool cabinet, in which a movable work platform 13 (see FIG. 2) serves as the cover body 122, and a lower wall 13' (see FIG. 2) that is connected within the cabinet body 11 serves as the bottom wall. Moreover, in other embodiments, the coupling opening 2 may be formed in the cabinet body 11 instead of the cover body 12.

Furthermore, the audio device 4 may be configured with a function that, within a proper range from the audio device 4, the user can answer phone calls via the audio device 4.

In the description above, for the purposes of explanation, numerous specific details have been set forth in order to provide a thorough understanding of the embodiment. It will be apparent, however, t one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A tool cabinet comprising:
  a cabinet unit including
    a cabinet body, and
    at least one receiving member that has
      a cover body movably connected to said cabinet body, and
      a bottom wall cooperating with said cover body to define a receiving space therebetween, said cover body being movable relative to said cabinet body to open and close said receiving space, one of said cabinet body and said cover body being formed with a coupling opening that is in communication with said receiving space; and
  an audio device engaging said coupling opening, received in said receiving space, and having a sound output surface that is exposed from said coupling opening;
    wherein said coupling opening is formed in said cover body;
    wherein said bottom wall is co-movable with said cover body;
    wherein said at least one receiving member further has a surrounding wall connected co-movably to said cover body and said bottom wall, and serving as a border of said receiving space; and
    wherein said tool cabinet further comprises a support seat disposed on said bottom wall of said at least one receiving member, and corresponding in position to said coupling opening.

2. The tool cabinet as claimed in claim 1, wherein:
  said tool cabinet further comprises a covering member disposed in said receiving space and dividing said receiving space into a first receiving portion and a second receiving portion;
  said coupling opening is in communication with said first receiving portion; and
  said audio device is covered by said covering member.

3. The tool cabinet as claimed in claim 2, wherein said support seat includes a lower support member mounted to said bottom wall, and an upper support member connected to said lower support member, and supporting said audio device thereon.

4. The tool cabinet as claimed in claim 3, wherein:
  said covering member has
    a side plate connected to said bottom wall of said at least one receiving member, and
    an upper plate extending from an end of said side plate that is distal from said bottom wall in a direction toward said surrounding wall; and
  said side and upper plates serve respectively as lateral and top borders of said first receiving portion of said receiving space.

5. The tool cabinet as claimed in claim 1, wherein said audio device further has a sound-emitting module, and a control module operable for generating a signal.

\* \* \* \* \*